United States Patent [19]

Shobert et al.

[11] Patent Number: 4,992,313
[45] Date of Patent: Feb. 12, 1991

[54] FIBER-REINFORCED PLASTIC STRUT CONNECTING LINK

[76] Inventors: James P. Shobert, 52189 Leland Ave., South Bend, Ind. 46637; Elson B. Fish, 21366 New Rd., Lakeville, Ind. 46536

[21] Appl. No.: 369,128

[22] Filed: Jun. 21, 1989

Related U.S. Application Data

[62] Division of Ser. No. 132,774, Dec. 14, 1987, Pat. No. 4,857,124.

[51] Int. Cl.$^5$ .............................................. D04C 1/00
[52] U.S. Cl. ................................ 428/36.1; 74/579 R; 87/1; 87/9; 428/245
[58] Field of Search ......................... 428/36.1; 52/726; 74/579 R, 581; 87/1, 9

[56] References Cited

U.S. PATENT DOCUMENTS

| | | | | |
|---|---|---|---|---|
| 2,983,182 | 5/1961 | Shobert | ............................. | 156/393 |
| 3,007,497 | 11/1961 | Shobert | ............................. | 156/149 |
| 3,553,978 | 1/1971 | Williams | ............................. | 464/181 |
| 3,592,884 | 7/1971 | Williams | ............................. | 464/181 |
| 4,411,114 | 10/1983 | Wurtinger et al. | ................ | 52/309.1 |
| 4,777,859 | 10/1988 | Plommer, Jr. | ..................... | 428/35.1 |
| 4,803,103 | 2/1989 | Pithouse et al. | .................. | 428/35.1 |

Primary Examiner—James Seidleck
Attorney, Agent, or Firm—Pearne, Gordon, McCoy & Granger

[57] ABSTRACT

A fiber-reinforced plastic article having first, second, and third cylindrical portions is disclosed. A helical braid is applied along a first cylindrical portion as a first cylindrical sleeve which conforms to and encases the outside surface of said first cylindrical portion. The second cylindrical portion is passed through the filaments forming the braid and the braid is collapsed into a first, substantially flat, double-ply braided ribbon which is then wrapped about the outer surface of the second intersection portion. The helical braid is again applied along the first cylindrical portion and a second braided ribbon is then wrapped about the outer surface of the third cylindrical portion. The fibers are impregnated with a thermosetting resin which is cured to produce the article.

3 Claims, 3 Drawing Sheets

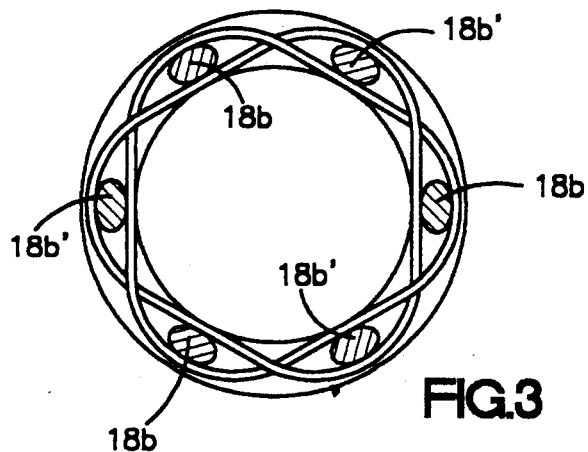
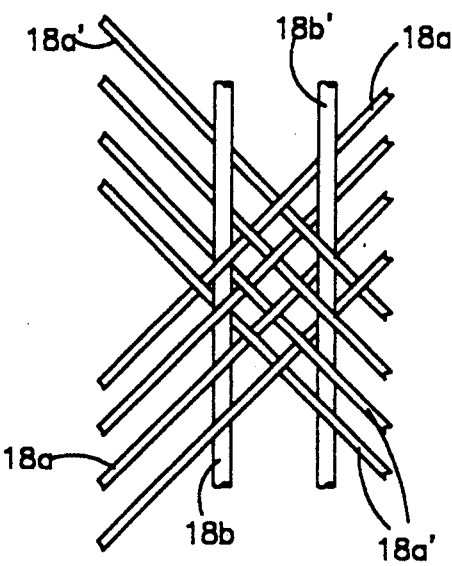
FIG.3
FIG.4
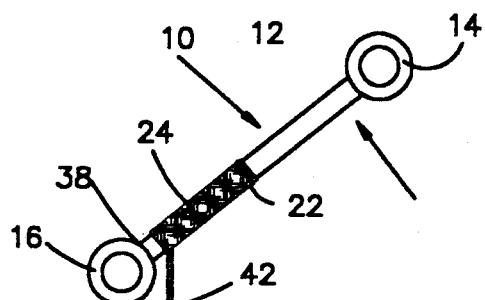
FIG.5
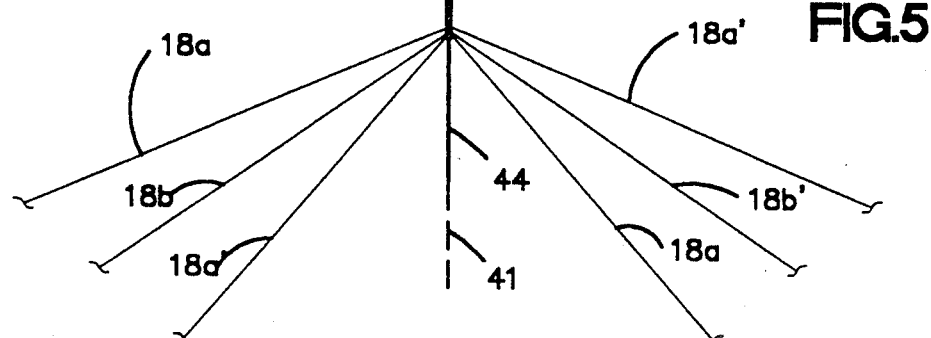
FIG.6
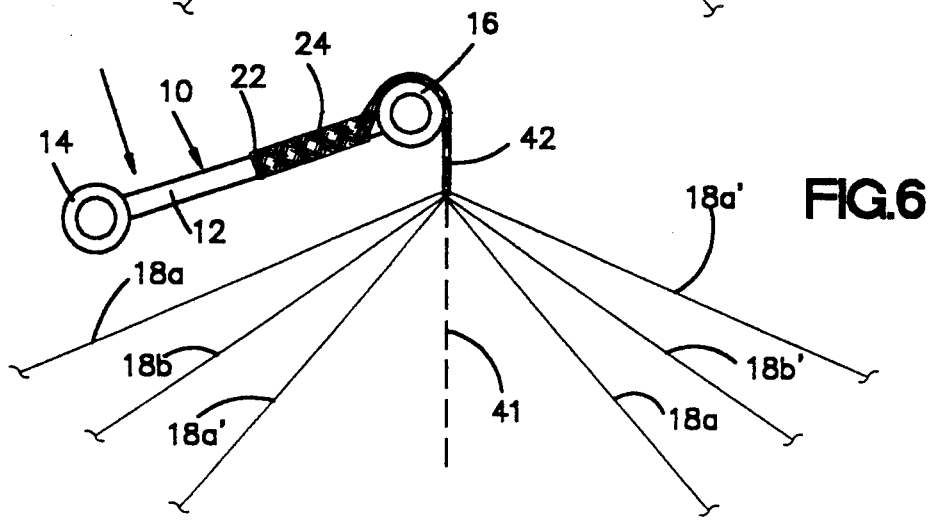

FIBER-REINFORCED PLASTIC STRUT CONNECTING LINK

This is a division of application Ser. No. 07/132,774 filed Dec. 14, 1987 now U.S. Pat. No. 4,857,124

BACKGROUND OF THE INVENTION

This invention relates to fiber-reinforced plastic articles and, more particularly, to a fiber-reinforced plastic connecting link or strut having a cylindrical body portion and first and second hollow cylindrical end portions having parallel axes which intersect the longitudinal axis of the cylindrical body portion.

Articles produced by this invention have particular utility as connecting rods in machinery where it is desirable to employ a lightweight connecting rod possessing high tensile, compressive, and torsional strengths. Such characteristics are particularly desirable for automotive and aircraft applications where strength-to-weight ratios are important design desiderata.

Various techniques have been proposed for fabricating fiber-reinforced plastic rodlike article which include variations of the basic pultrusion techniques developed by Francis and Meek in U.S. Pat. Nos. 2,602,766 and 2,684,318, respectively, and later perfected by Shobert in U.S. Pat. Nos. 2,852,425; 2,983,182; 3,007,497; and 3,033,729.

In Meek U.S. Pat. No. 2,684,318, there is disclosed and claimed a method for fabricating glass-reinforced plastic rods of solid cross section. In Francis U.S. Pat. No. 2,602,766, there is disclosed a method of fabricating hollow glass-reinforced plastic rods. These hollow rods are fabricated by first arranging a plurality of glass threads into a longitudinal bundle, inserting a mandrel into the central portion of the bundle so as to provide a core therefor, and, finally, braiding glass thread around the outer surface of the thread bundle. This braided bundle is thereafter immersed in resin which is cured to firmly bond the threads together in self-supporting form. The mandrel is thereupon removed, thereby providing a hollow center for the finished rod.

In Shobert U.S. Pat. No. 2,983,182, the patentee discloses a technique for fabricating tubing composed of two tubular laminations, the inner lamination comprising substantially straight, longitudinal threads distributed evenly circumferentially, and the outer lamination comprising helically wound threads. In U.S. Pat. No. 3,007,497 to Shobert, the patentee provides a technique for interlocking helical and longitudinal strands to ensure that the longitudinal strands will be evenly distributed about the circumference of the rod.

All of these techniques are directed to batch or continuous operations for producing fiber-reinforced plastic rods wherein the fibers are helically woven on a mandrel or longitudinally arranged with or without a supporting mandrel, and wherein the weaving or arranging progresses along a single axis. To applicant's knowledge, no attempt has been made to conduct weaving or filament laying operations on a winding form which includes a plurality of cylindrical portions having intersecting axes.

SUMMARY OF THE INVENTION

This invention provides techniques for weaving or braiding filaments which includes a winding form which has a plurality of cylindrical portions having intersecting axes, with the fibers being woven and laid on the form as continuous filaments. According to this invention, a winding form is provided having first and second intersecting cylindrical portions. These portions may be arranged with the second intersecting cylindrical portion at right angles to the first cylindrical portion, and may be hollow so that a suitable bearing or bushing may be provided therein. The other end of the first cylindrical member may be provided with a similar cylindrical member.

A helical braid of woven continuous filaments is applied to the cylindrical surface of the first portion by employing a braiding technique similar to that described in U.S. Pat. No. 3,007,497. The roving strands are initially gathered and tied at the midportion of the first cylindrical portion, and the weaving operation is performed to form a sleeve from the midportion of the first cylindrical portion to the angularly related second cylindrical portion. During this weaving operation, the roving filaments extending from the roving cakes to the mandrel tend to form a conical tentlike arrangement which resembles a maypole. When the first portion of the article has been braided in the foregoing manner, the second cylindrical surface is passed through the filaments forming the cone and the braiding operation is continued to form a substantially flat, double-ply braided ribbon. In order to prevent this ribbon from becoming distorted due to the lack of a supporting mandrel, a flat, flexible sheet is inserted between the plies. The ribbon is braided until it has a longitudinal extent corresponding to the circumference of the second cylindrical portion. The ribbon is wrapped around the second cylindrical portion and the first cylindrical portion is reinserted between the filaments so that its axis once again corresponds to the original braiding axis. The braiding operation is resumed so that second sleeve is formed on the first cylindrical portion and the weaving operation is continued until the sleeve reaches a third cylindrical portion at the other end of the first cylindrical portion. The ribbon forming operation is performed to provide the third cylindrical portion with a circumferential braid, and the weaving operation is again resumed on the first cylindrical portion to provide a third sleeve which terminates at the midportion of the first cylindrical portion.

After these operations have been performed, the fibrous article is impregnated with a suitable thermosetting resin by placing the article in a mold which closely conforms to the shape of the fibrous form and conforms to the desired shape of the finished article. Resin is admitted to the mold cavity under pressure to impregnate the article. In some instances, it may be desirable or necessary to draw a vacuum within the cavity of ensure complete impregnation and to allow for the escape of any entrapped gases. The mold is then heated to a resin-setting temperature and, thereafter, the finished article is removed from the mold.

The term "cylindrical" as used herein refers to and means the surface traced by any straight line moving parallel to a fixed straight line.

BRIEF DESCRIPTION OF THE DRAWINGS

FIG. 3 is an elevational view of the braiding pattern;

FIG. 4 is a plan view of the braiding pattern;

FIG. 5 is a diagrammatic view illustrating the ribbon-forming technique according to this invention;

FIG. 6 is an illustration similar to FIG. 5, but showing the ribbon partially wrapped about one of the cylindrical portions of the winding form;

DETAILED DESCRIPTION OF THE DRAWINGS

Figure 1:
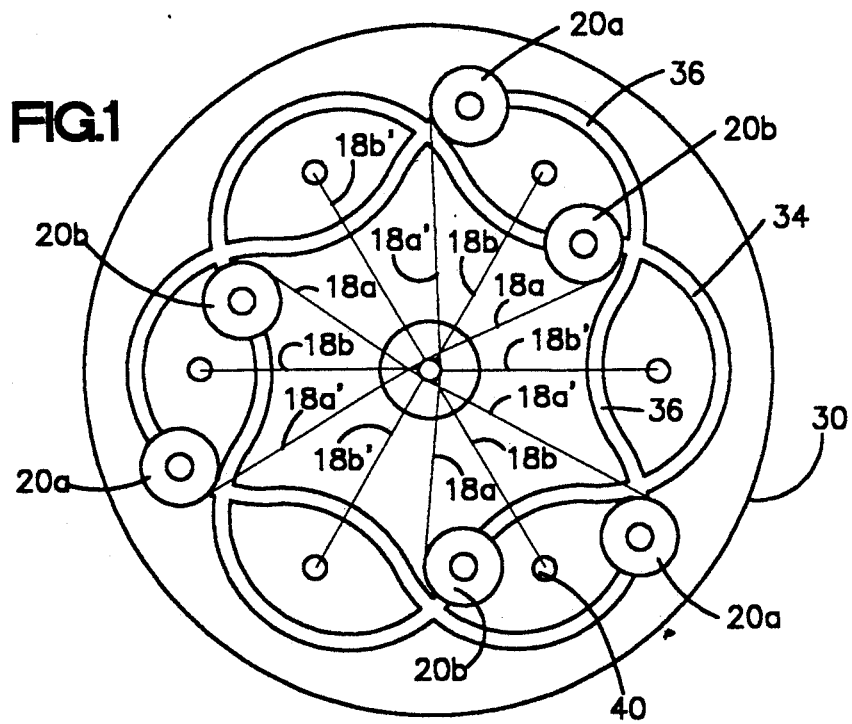
FIG. 1 is a top plan view in diagrammatic form of an apparatus used in the fabrication of the article according to this invention.
Figure 2:
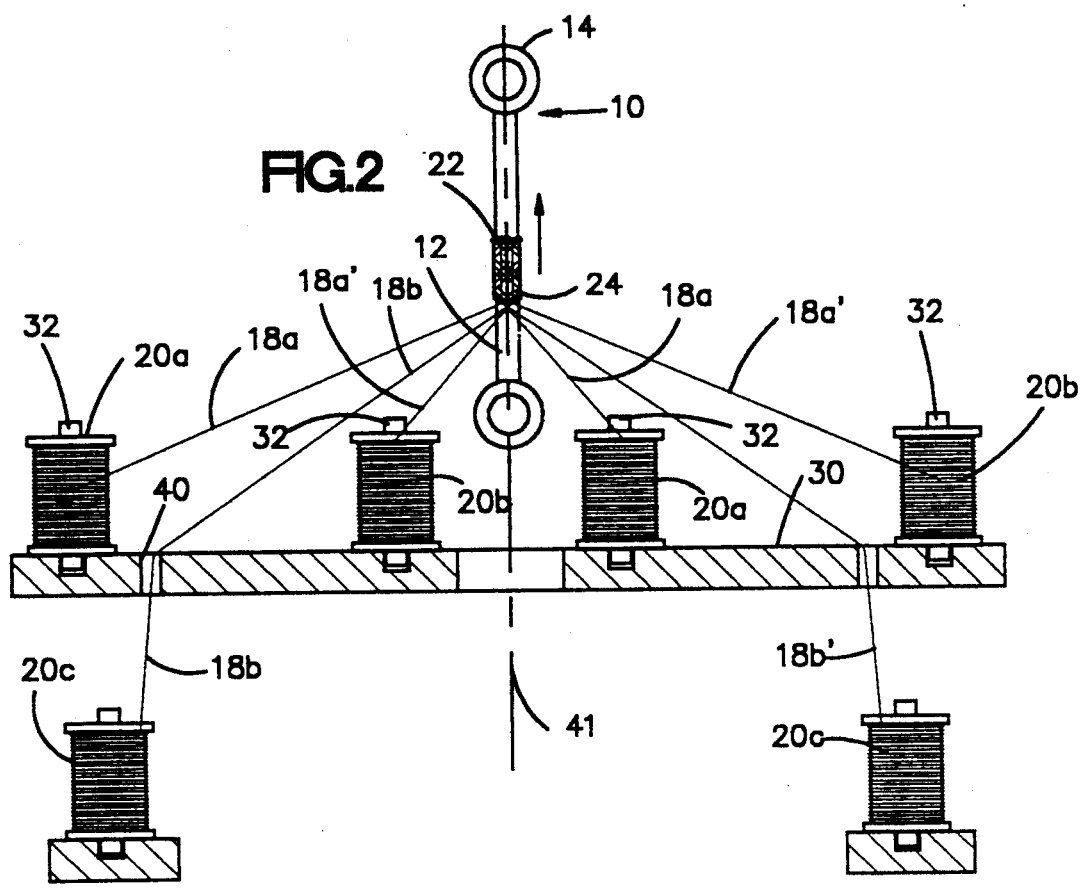
FIG. 2 is a diagrammatic illustration, partly in vertical section, of the arrangement of FIG. 1.

Referring now to the drawings, and particularly to FIGS. 1 and 2, there is illustrated a winding form 10 which comprises a cylindrical rod 12, which comprises a first cylindrical portion of the form 10 and hollow cylindrical eye portions 14 and 16, which comprise second and third cylindrical portions of the form 10 and which have axes parallel to each other and perpendicular to the axis of the rod 12. The rod 12 and the eye portions 14 and 16 may be molded from a suitable thermoplastic or thermosetting molding compound or may be formed from a sacrificial material according to well-known techniques, since the molding form in many instances is not relied upon as providing structural strength to the finished article.

A plurality of fiber roving 18, which may be glass fiber rovings, are trained from a corresponding plurality of roving cakes 20 and are tied to the midportion of the rod 12 by suitable fastening means such as adhesive tape or a circumferential winding 22. The winding form 10 is then advanced axially and vertically upwardly, as indicated by the arrow in FIG. 2. A helical braid of woven continuous filaments is applied to the rod 12 as a first cylindrical sleeve 24, which conforms to and encases the outside surface of the rod 12. The helical braid may be formed by means of any conventional braiding machine similar to the one disclosed in the Francis U.S. Pat. No. 2,602,766. By following the individual strands of the braid in FIGS. 3 and 4, it will be noticed that the filaments 18a are interlocked with the filaments 18a'. It may be noted that the filaments 18a pass on the outside of the filaments 18b' but on the inside of the adjacent filaments 18b.

A conventional braiding machine is schematically illustrated in FIGS. 1 and 2, and includes a supporting table 30 having a suitable number (six in the present instance) of roving cakes 20a and 20b mounted thereon. The roving cakes 20a and 20b are supported on suitable spindles 32 which fit into guide grooves 34 and 36, which grooves follow a circumferential undulating pattern, as illustrated in FIG. 1. There are two series of roving cakes on the table 30, the roving cakes 20a being characterized herein as the "outer roving cakes," while the roving cakes 20b are considered the inner roving cakes. The only reason for this characterization is to demonstrate more clearly by reference to FIG. 1 that there are two different undulating grooves 34 and 36 which cross over symmetrically, as illustrated.

Beneath the table 30 are disposed a plurality (in the present instance, six) of roving cakes 20c. The filament from each cake 20c is passed through a receptive clearance opening 40 in the table 30 and attached in the previously described manner to the rod 12. Thus, as the form 10 is pulled upwardly in the direction of the arrow in FIG. 2, filaments are pulled off each roving cake. The filaments 18b and 18b' of FIGS. 1 and 2 will now be recognized as being the same as the filaments contained on the cakes 20c, while the braid formed by the filaments 18a and 18a' are the same as those contained on the roving cakes 20a and 20b.

In operation, the form 10 is slowly raised in the direction of the arrow, while the roving cakes 20a and 20b are moved in opposite directions at a uniform rate of speed through their guiding grooves 36 and 34, respectively. Considering for the moment the motion of one spool 20a, it will be seen that it will pass outside and inside alternate filaments 18b and 18b', while at the same time forming an interleaving braid with the filaments from the roving cake 20b. The roving cake 20b works oppositely so that in the finished product there are an equal number of filaments disposed on the outside of each longitudinal filament 18b and 18b', and on the inside. The form 10 is continuously raised at a uniform rate until the braiding operation reaches a juncture zone 38 between the rod 12 and the cylindrical portion 16.

After the braid sleeve has reached the zone 38, the cylindrical portion 16 is passed through adjacent filaments so that the cylindrical portion 16 is no longer within the cone formed by the filaments, and so that the axis of the rod 12 is angularly related to a braiding axis 40.

Nevertheless, the braiding operation is continued, as is illustrated in FIG. 5, so that a first substantially flat, double-ply braided ribbon 42 is formed. To maintain the dimensional integrity of the ribbon 42, the braiding is woven on a flat, flexible strip of plastic 44 which has a width corresponding to the axial extent of the cylinder 16 and a length corresponding to the circumference of the cylinder 16.

Figure 7:
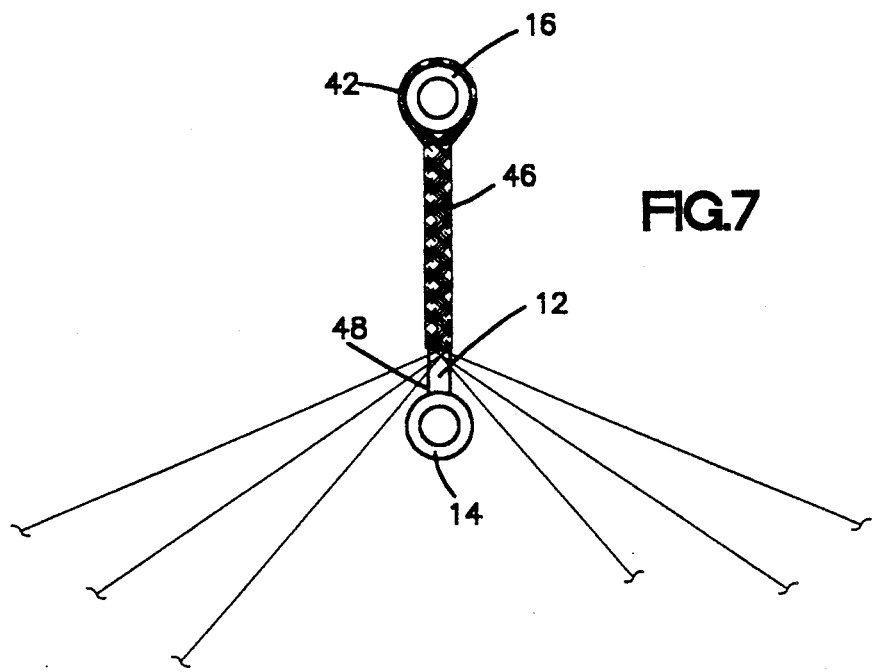
FIG. 7 is a diagrammatic view similar to FIGS. 5 and 6, showing a further stage of the weaving operation.
Figure 8:
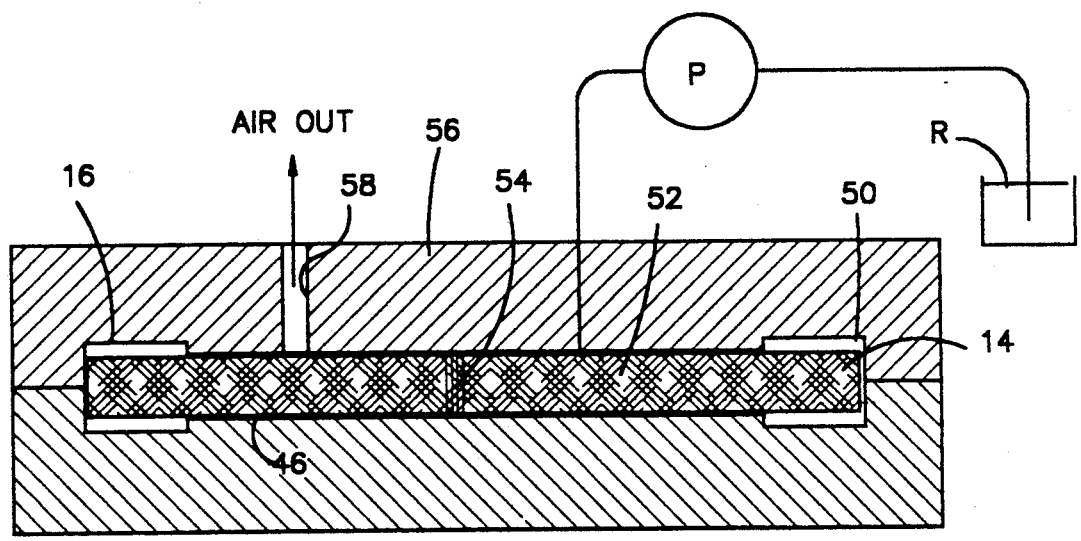
FIG. 8 is a cross-sectional view illustrating the article in a resin-impregnating mold.

After the ribbon 42 has been formed in this manner, the form 10 then rotated in the direction of the arrows in FIGS. 5 and 6 to wrap the ribbon 42 about the cylindrical portion 16 and to pass the cylindrical portion 14 between adjacent filaments until the rod 112 is once aligned with the braiding axis 40. A second cylindrical sleeve 46 (FIG. 7) is wrapped over the first cylindrical sleeve 24 in the manner previously described, and the sleeve 46 is continued until it reaches a juncture zone 48 between the rod 12 and the cylindrical portion 14. The ribbon-forming operation described with reference to FIGS. 5 and 6 is repeated to form a second ribbon 50 and the ribbon 50 is wrapped about the circumference of the cylindrical portion 14 in the manner previously described in connection with FIG. 6. After the ribbon 50 has been wrapped about the portion 14 and the axis of the rod 12 is once again aligned with the braiding axis 40, a third braided sleeve 52 is woven over the sleeve 46 to the midpoint of the form 10, at which point adhesive tape or filaments 54 are wound about the sleeve 52 and the filament ends are cut to release the braided form from the braiding machine.

The fiber-reinforced form is then placed in a mold 56 and a metered amount of resin R is pumped from a reservoir to the mold cavity to fill the cavity and completely impregnate the fibers forming the reinforcement. The mold cavity closely conforms to the desired external dimensions of the molded article so that the external appearance will not exhibit the braided pattern. If desired, or necessary, a vacuum may be applied to the mold cavity through a vent 58, but in any event the vent should be provided so that air is not entrained in the fibers.

The resin may be any suitable thermosetting resin, such a epoxy, polyester, or vinylester, and the reinforcement may be glass, carbon, or metallic filaments.

Also, as may be appreciated, thermoplastic resins may be employed.

The various manipulative steps involved in performing the invention may be accomplished by hand or by robotic equipment.

Although the preferred embodiment of this invention has been shown and described, it should be understood that various modifications and rearrangements of the parts may resorted to without departing from the scope of the invention as disclosed and claimed herein.

What is claimed is:

1. A fiber-reinforced plastic article having an elongated first cylindrical portion and integral second and third cylindrical portions at its ends which are perpendicular to said first cylindrical portion, said article being defined by a resin-inpregnated braided sleeve forming a cylinder to define said first cylindrical portion and forming flat loops which define said second and third cylindrical portions.

2. A fiber-reinforced plastic article according to claim 1, wherein said braided sleeve extends from a midportion of said first cylindrical portion, forms a flat loop to define said second cylindrical portion, extends as a cylinder to define the entire extent of said first cylindrical portion, forms a loop to define said third cylindrical portion, and continues as a cylindrical sleeve to the midportion of said first cylindrical portion.

3. A fiber-reinforced plastic article according to claim 2, wherein flat flexible webs are provided in said second and third cylindrical portions.

* * * * *